United States Patent
Gelencser

(10) Patent No.: US 12,485,949 B2
(45) Date of Patent: Dec. 2, 2025

(54) OPERATING INPUT DEVICE AND STEERING INPUT DEVICE

(71) Applicant: Valeo Schalter und Sensoren GmbH, Bietigheim-Bissingen (DE)

(72) Inventor: Jozsef Gelencser, Veszprem (HU)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 208 days.

(21) Appl. No.: 18/277,881

(22) PCT Filed: Feb. 15, 2022

(86) PCT No.: PCT/EP2022/053572
§ 371 (c)(1),
(2) Date: Aug. 18, 2023

(87) PCT Pub. No.: WO2022/175220
PCT Pub. Date: Aug. 25, 2022

(65) Prior Publication Data
US 2024/0132136 A1    Apr. 25, 2024
US 2024/0227909 A9    Jul. 11, 2024

(30) Foreign Application Priority Data
Feb. 18, 2021   (DE) .................... 10 2021 103 823.5

(51) Int. Cl.
*B62D 1/04*    (2006.01)
*B60K 35/10*   (2024.01)
(Continued)

(52) U.S. Cl.
CPC .............. *B62D 1/046* (2013.01); *B60K 35/10* (2024.01); *B60K 35/25* (2024.01); *B60K 35/60* (2024.01);
(Continued)

(58) Field of Classification Search
CPC ........ G06F 3/016; G06F 3/03547; G06F 3/01; G06F 3/0354; B60K 35/10; B60K 35/60; B60K 35/25; B62D 1/046; B62D 1/04
(Continued)

(56) References Cited

U.S. PATENT DOCUMENTS 10,229,795 B2 *   3/2019   Fust ...................... B60K 35/10
2019/0227630 A1   7/2019   Masamoto et al.

FOREIGN PATENT DOCUMENTS

DE    102008058566 A1    5/2010
DE    102015000484 A1    7/2016
(Continued)

OTHER PUBLICATIONS

International Search Report and Written Opinion in corresponding International Application No. PCT/EP2022/053572, dated May 23, 2022 (11 pages).

(Continued)

*Primary Examiner* — Anthony R Jimenez
(74) *Attorney, Agent, or Firm* — Osha Bergman Watanabe & Burton LLP

(57) ABSTRACT

An operating input device for a vehicle and to a steering input device is disclosed. The operating input device has an upper part having an operating input surface with an input area associated with an operating function, and a lower part serving as a support structure for the upper part. The upper part is relatively movable to the lower part by an operating input force applied on the operating input surface in an operating input direction extending substantially perpendicular to the operating input surface. For generating a haptic feedback, the upper part and the lower part are coupled movably relative to each other such that by a feedback actuation mechanism, which is couplable to the operating input device, the upper part is movable relatively (Continued)

Figure 1:
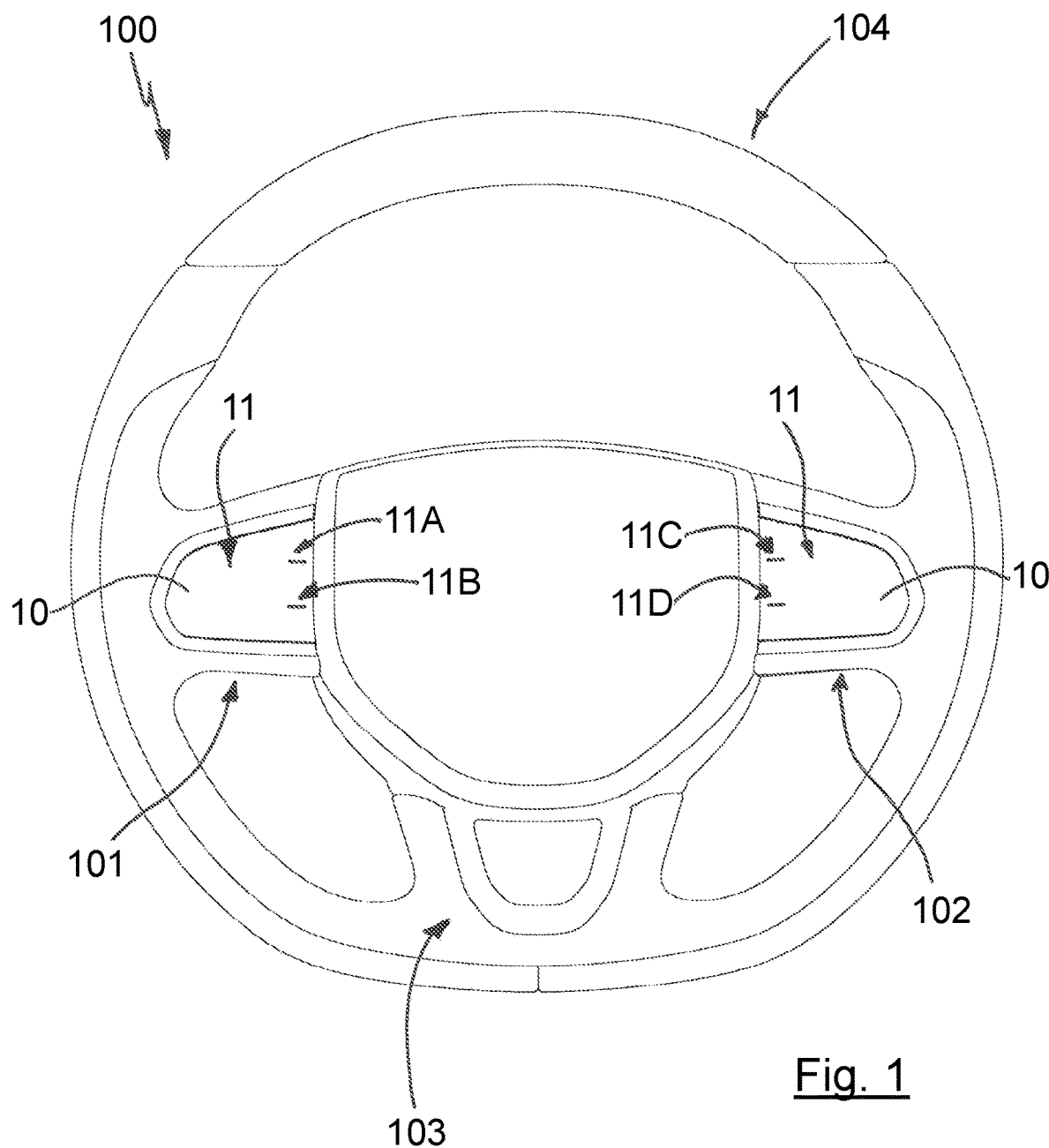

to the lower part at least in a first haptic feedback generating direction extending at least substantially parallel to the operating input surface.

14 Claims, 4 Drawing Sheets

(51) Int. Cl.
*B60K 35/25* (2024.01)
*B60K 35/60* (2024.01)
*G06F 3/01* (2006.01)
*G06F 3/0354* (2013.01)

(52) U.S. Cl.
CPC .......... *G06F 3/016* (2013.01); *G06F 3/03547* (2013.01); *B60K 2360/1446* (2024.01); *B60K 2360/782* (2024.01)

(58) Field of Classification Search
USPC ...................................................... 200/61.54
See application file for complete search history.

(56) References Cited

FOREIGN PATENT DOCUMENTS

| | | |
|---|---|---|
| DE | 102016114697 A1 | 2/2018 |
| FR | 3039671 A1 | 2/2017 |
| FR | 3042616 A1 | 4/2017 |
| WO | 2018-108398 A1 | 6/2018 |
| WO | 2020-241513 A1 | 12/2020 |

OTHER PUBLICATIONS

German Search Report in corresponding German Application No. 10 2021 103 823.5, dated Oct. 29, 2021 (5 pages).

\* cited by examiner

OPERATING INPUT DEVICE AND STEERING INPUT DEVICE

The present invention relates to an operating input device for a vehicle, wherein the operating input device is preferably configured for an arrangement in an interior of a vehicle, in particular for an arrangement in a steering input device of a vehicle. The operating input device comprises an upper part comprising an operating input surface with at least one input area associated or associable to at least one operating function, and a lower part, which is serving as a support structure for the upper part. The upper part is relatively movable to the lower part by an operating input force applied on the operating input surface in an operating input direction extending at least substantially perpendicular to the operating input surface, wherein for generating a haptic feedback the upper part and the lower part are coupled movably relative to each other such that by a feedback actuation mechanism, which is couplable to the operating input device, the upper part is movable relatively to the lower part at least in a first haptic feedback generating direction extending at least substantially parallel to the operating input surface. The operating input device further comprises at least one damping element arranged and configured to damp a relative movement between the upper part and the lower part in said operating input direction and/or in said first haptic feedback generating direction.

The present invention further relates to a steering input device comprising at least one operating input device.

Operating input devices as mentioned above and steering input devices comprising at least one of such an operating input device are in general well known from prior art, for example from WO 2018/108398 A1.

Against this background, it is one object of the present invention to provide an alternative operating input device, in particular an improved operating input device, preferably allowing a more precise haptic feedback generation, and an alternative, in particular improved steering input device.

These objects are achieved by an operating input device and by a steering input device according to the respective independent claims. Advantageous embodiments of the invention are the subject of the dependent claims, the description and the figures.

An operating input device according to the present invention is preferably configured for a vehicle, preferably for an arrangement in an interior of a vehicle, in particular for an arrangement in a steering input device of a vehicle, and comprises an upper part comprising an operating input surface with at least one input area associated to at least one operating function, and a lower part, which is serving as a support structure for the upper part, wherein the upper part is relatively movable to the lower part by an operating input force applied on the operating input surface in an operating input direction extending at least substantially perpendicular to the operating input surface. For generating a haptic feedback the upper part and the lower part are coupled movably relative to each other such that by a feedback actuation mechanism, which is couplable to the operating input device, the upper part is movable relatively to the lower part at least in a first haptic feedback generating direction extending at least substantially parallel to the operating input surface. An operating input device according to the present invention further comprises at least one damping element arranged and configured to damp a relative movement between the upper part and the lower part in said operating input direction and/or in said first haptic feedback generating direction.

An operating input device according to the present invention is characterized in that the at least one damping element is axially immovably arranged in the operating input device in a non-damping direction different from the operating input direction and the first haptic feedback generating direction.

The axial fixation of the damping element in the third, non-damping direction makes it possible to provide an easy-to-manufacture and easy-to-assemble operating input device that enables both advantageous damping of an operating input force and of a generated feedback force, so that a haptic feedback that is pleasant for an operator can be generated.

An operating input device according to the present invention enables a simple design of the mounting of the damping element, in particular an axial fixation without one or more additional components, but rather a fixation by the upper part and/or the lower part itself. With an operating input device designed according to the present invention in particular no other components, as for example one or more screws or the like, are necessary to fix the damping element within the operating input device. The axial fixation of the damping element can for example be achieved just by simple protrusions or the like of the upper part and/or the lower part.

By the damping element further noise risk and/or damage risk caused by the relative movement of the upper part relative to the lower part during feedback generating can be reduced.

By fixation of the damping element in a non-damping direction, damping and play in the other (damping) direction(s) can be controlled very well, in particular without decreasing noise performance. By adaption of the damping element properties, for example of material properties and damping element dimensions, damping properties can be adjusted in a very easy manner with almost no or without adaption of other parts or components of the operating input device.

The damping element preferably comprises rubber material and/or an elastomeric material or is made of such a material or a combination thereof. The damping element may be made of one material completely or of at least two or of more than two material, in particular depending on the desired damping properties.

By adapting the cross-section(s) respective the geometry and dimensions of the damping element for example from circle to oval or rectangle or the like, damping properties can be designed/adapted on the existing user/customer haptic requirements in a very easy manner. Thereby, in an easy manner, a very pleasant haptic input feeling and a pleasant haptic feedback can be achieved and flexibly adapted.

The damping element can be designed in a very easy manner, in particular without any undercuts. This allows providing a very inexpensive damping element. In many cases, a simple rubber element is sufficient as a damping element, in particular a damping element having no undercut.

In a preferred embodiment of an operating input device according to the present invention the damping element is arranged axially immovably in a non-damping direction which is in particular extending perpendicular to said operating input direction and/or perpendicular to said first feedback generating direction. Thereby, an operating input device can be provided which can be designed and manufactured, in particular assembled, in a very easy manner.

In a preferred embodiment of an operating input device according to the present invention the damping element is arranged in the operating input device such that it is axially fixed in a non-damping direction extending at least substantially parallel to the operating input surface, wherein the non-damping direction is in particular a horizontal direction with respect to a use state of the operating input device.

An operating input device allows in particular an easy and flexible adaptation of the damping properties in different directions. More stiffness in operating input force direction for example, may be achieved by increasing the cross-section of the damping element in this direction. Less stiffness in the first haptic feedback direction, for example to reduce necessary feedback generating forces as a result, may be achieved by a reduced cross-section in this direction and/or by using a damping material having a lower shore hardness for example.

Moreover, an operating input device according to the present invention is suitable for the use of different feedback actuation mechanisms, in particular with all type of actuators. However, an operating input device respectively a damping element configured for damping in at least two directions, in particular in the operating input force direction and in the first haptic feedback generating direction, is in particular suitable for being paired with an ERM-actuator, that means an Eccentric Rotational Mass motor, which is arranged such that it causes movement in both of the damping directions (the operating input force direction and the first haptic feedback generating direction).

An operating input device according to the present invention further allows arrangement of the damping element without any pretension or preload in damping direction(s). Thereby, the risk of reduction of the pretension/preload and of changing of damping properties over lifetime can be reduced or even completely eliminated. Further, less forces for generating a haptic feedback are sufficient since no preload has to overcome.

An "operating input device" according to the present invention is a device which is configured to detect an operator's input. Therefore, an operating input device preferably comprises at least one sensor element and is in particular configured to evaluate at least one sensor signal generated by said at least one sensor element. Preferably an operating input device according to the present invention is further configured to output at least one control signal, for example to control at least one operating function. For this purpose, an operating input device according to the present invention may further comprise at least one control unit.

An operating input device according to the present invention is preferably at least configured to detect an operator's input applied to the input surface, preferably an operator's input which is based on an input force, in particular on an input force which is applied at least partly in a direction perpendicular to the input surface.

For this purpose, the operating input device further may comprise a force sensor element for detecting an operating input force applied to the operating input surface.

A "force sensor element" according to the present invention is a sensor element or a sensor assembly which is configured to detect, in particular to measure, an applied force.

An operating input device according to the present invention may comprise one or more force sensor elements, wherein at least one force sensor element is preferably arranged to detect, in particular to measure, at least a part of an input force applied to the operating input surface, in particular the part of an input force acting in a direction perpendicular to the input surface and/or perpendicular to the feedback generating direction. Force sensor elements are in general well known from prior art to which herewith is referred to regarding further information and details with respect to functional and design aspects.

To transfer an operating input force applied to the operating input surface of the operating input device to the force sensor element, the operating input device may also comprise an operating input force transfer element.

An "operating input force transfer element" according to the present invention is an element, which is configured to transfer an input force. The operating input force transfer element of an operating input device according to the present invention is therefore preferably designed such that an applied input force can be transferred in particular as lossless as required for the respective use case, in particular as required for measurement accuracy of an operating input force applied to the input surface, preferably substantially lossless. This can be achieved, for example, with a substantially rigid operating input force transfer element.

Additionally or alternatively, the operating input device may comprise one or more other sensor means for detecting an operating input applied to the operating input surface, for example capacitive sensor means.

In one embodiment of an operating input device according to the present invention in particular in a preferred embodiment, the operating input device may be configured to detect a touch of the input surface by a capacitive actuating means, for example by a finger or a hand of human, wherein the operating input device therefore preferably comprises at least one capacitive sensor unit with at least one capacitive sensor element, wherein at least one capacitive sensor element is preferably arranged beneath the input surface. This enables providing of an operating input device having one or more input areas, wherein each input area may be associated to at least one operating function. This enables providing of an advantageous multi-function operating input device in a very easy manner.

In a preferred embodiment of an operating input device according to the present invention the operating input device may comprise more than one input area, wherein preferably each input area is associated to at least one operating function. This enables providing of an advantageous multi-function operating input device in a very easy manner.

Does an operating input device according to the present invention comprise more than one input area, the operating input device is in particular configured to localise a touch on the input surface. Thereby, it may be possible to detect in which input area of the input surface the input surface has been touched and which operating function should be triggered.

The upper part of an operating input device according to the present invention may be made as one piece or may be an assembly, that means assembled of several single parts, wherein at least one part is preferably made by injection moulding of a plastic material, in particular a rigid plastic material.

In a preferred embodiment the upper part of an operating input device according to the present invention is assembled of at least one part comprising the operating input surface and of one part for coupling with the lower part. The operating input surface may for example be made of glass or another transparent material or another material. However, the operating input surface is preferably made of an at least semi-translucent material, in particular such that the input surface may be illuminated by a background light source.

The lower part of an operating input device according to the present invention, which serves as a support structure for the upper part, may be made as one piece or may be an assembly, that means assembled of several single parts, wherein at least one part is preferably made by injection moulding of a plastic material, in particular a rigid plastic material.

A "rigid material" in the meaning of the present invention is a material which is substantially uncompressible at temperature conditions during use. For some use cases a part or component to be made of a "rigid material" of an operating input device according to the present invention may for example be made of or may contain a thermoplastic material as for example polyamide, acrylonitrile butadiene styrene (ABS), polyamide (PA), polylactate (PLA), polymethyl methacrylate (PMMA), polycarbonate (PC), polyethylene terephthalate (PET), polyethylene (PE), polypropylene (PP), polystyrene (PS) or polyetheretherketone (PEEK) and polyvinyl chloride (PVC) or a combination thereof. For other uses cases, in particular for use at higher temperatures, a duroplast seems to be more suitable for use as "rigid material", e.g. polyurethane, polyester or an epoxy resin or a combination thereof.

In a preferred embodiment the lower part of an operating input device according to the present invention is assembled of at least one support structure, which is in particular a support frame and forms a top part of the lower part, and a bottom part, which in particular serves as a rear cover of the operating input device.

The operating input device may further in particular comprise a circuit board, in particular a printed circuit board, onto which for example a force sensor element or a capacitive sensor element may be mounted. In a preferred embodiment the circuit board can be arranged at least partly within the operating input device, in particular at least partly in a void formed by the upper part and the lower part when assembled.

In the meaning of the present invention the term "movably coupled" in relation to the coupling of the upper part with the lower part means a coupling allowing a relative movement between the upper part and the lower part, which on the one hand is perceived as a haptic feedback by an operator and which on the other hand creates a pleasant operating input feeling. In some use cases "movably coupled" may be realised just by providing a defined play (which can be achieved by a play fit) between the upper part and the lower part. In other use cases the necessary movement may require more relative movement which cannot be realised just by providing a defined play by a play fit between the upper part and the lower part, rather requires a special design, which allows sufficient relative movement between the upper part and the lower part.

A "feedback actuation mechanism" in the meaning of the present invention preferably comprises at least one feedback actuator, for example an electric motor or similar, which may be coupled to at least one of the upper part and the lower part and which may cause movement of at least one of these parts relatively to the other one.

In one embodiment of an operating input device according to the present invention the at least one damping element may be axially fixed in the operating input device in said non-damping direction by a first end stop and a second end stop arranged oppositely to each other in the axial direction, wherein the damping element is arranged between these end stops in axial direction.

This kind of axial fixation of the damping element in the third, non-damping direction makes it possible to provide a very easy-to-manufacture and very easy-to-assemble operating input device that enables both advantageous damping of an operating input force and of a generated feedback force, so that a haptic feedback that is pleasant for an operator can be generated.

This allows a very simple design of the mounting of the damping element, in particular an axial fixation without one or more additional components, but rather a fixation by the upper part and/or the lower part itself. With an operating input device designed according to the present invention, in particular no other components, as for example one or more screws or the like, are necessary to fix the damping element within the operating input device.

The axial fixation of the damping element can for example be achieved just by simple protrusions of the upper part and/or the lower part.

By using end stops for fixation of the damping element in a non-damping direction, damping and play in the other (damping) direction(s) can be controlled very easily. In a preferred embodiment according to the present invention the damping element has in particular been arranged in the operating input device just by insertion, in particular by insertion in axial direction respectively in non-damping direction during assembly. That means, no complex fastening step is required to fix the damping element. It only has to be inserted in the intended place. This allows providing an operating input device which can be assembled fast and easy and as a result cost-effective.

In one embodiment of an operating input device according to the present invention the at least one damping element is designed like a plug, in particular a cover plug, having at least a cover section having a larger outer diameter and a body section having a smaller outer diameter compared to the cover section. This design allows providing a very advantageous damping element which has an easy design, requires in particular no undercuts, has advantageous damping properties, can easily and cost-effective be manufactured and allows easy assembling and also easy and flexible adjustment of the damping properties.

Instead of having two different outer diameters alternatively a damping element having a constant outer diameter can be used.

However, the difference in the outer diameters between the cover section and the body section, which are in particular adjacent to each other, forms a shoulder, which allows an easy fixation of the axial position of the damping element in the operating input device, in particular, if said shoulder is configured to be brought in contact with a contact surface of at least one of the end stops.

In general, the damping element may be at least partly or completely massive or hollow, or both (partly massive and partly hollow), wherein the damping elements design is preferably based on the desired damping properties.

The damping element may have at least partly a circle cross-section or an oval or rectangle cross-section, which might also vary over the length of the damping element, in particular in non-damping direction.

Preferably, the top surface of the cover section is configured to be arranged contacting the other end stop.

In one embodiment of an operating input device according to the present invention the damping element is arranged in the operating input device between the upper part and the lower part, wherein the damping element is preferably supported by the lower part and/or the upper part in the operating input force direction, in particular via its body section. This allows providing of an operating input device, which is very easy to assembly and allows a good relative movement between the upper part and the lower part and an advantageous damping of that movement and therefore generating a pleasant haptic feedback.

In one embodiment of an operating input device according to the present invention the at least one damping element is free of an undercut. Thereby, a damping element can be provided, which can be manufactured very cost-effectively.

In one embodiment of an operating input device according to the present invention the first end stop or the second end stop is formed by a contact surface, in particular by a contact area adjacent to a recess, wherein the recess in particular is a bore hole or a through hole, wherein said contact surface forming said end stop is preferably extending perpendicular to the non-damping direction in which the damping element is axially immovably. This allows a very easy fixation of the axial position of the damping element in the operating input device in one axial direction in the non-damping direction and a precise arrangement in the operating input device, in particular if the damping element is plug configured to be inserted at least partly in that recess, and an easy assembly of the operating input device.

In one embodiment of an operating input device according to the present invention the second end stop or the first end stop, in particular the other end stop of said two end stops, is formed by a protrusion extending perpendicular to said non-damping direction in which the damping element is axially immovably, wherein the protrusion in particular is extending at least partly parallel to the contact area, and preferably arranged on the side of the other end stop facing away from the contact area. This allows a very easy fixation of the axial position of the damping element in the operating input device in the other axial direction, in particular after inserting of the damping element in the recess, if the protrusion is arranged on the side of the other end stop facing away from the contact area.

Instead of a contact area forming an end stop, also two protrusions arranged oppositely for arranging the damping element in non-damping direction in between can be form the first and second end stops.

In one embodiment of an operating input device according to the present invention the lower part and/or the upper part comprises or is an assembly made up of several parts, wherein said assembly comprises at least a top part and a bottom part, wherein preferably one of the two axial end stops is part of the top part, and wherein the other one of said two axial end stops is in particular part of the bottom part. This allows a very easy design of the operating input device and an easy assembly and arrangement of the damping element in the operating input device, in particular in between the upper part and the lower part. With such an operating input device, the damping element can be fixed in non-damping direction just by assembling, in particular if by assembling the end stops are brought in their respective "locking position" relative to the damping element.

In one embodiment of an operating input device according to the present invention the contact area is part of the top part or of the bottom part of said assembly whilst the protrusion is part of the respective counterpart of the assembly, i.e. of the bottom part or the top part. With such an operating input device, the damping element can be fixed in non-damping direction just by assembling of the top part and the bottom part, if by assembling the end stops are brought in their respective "locking position" relative to the damping element.

Preferably, at least one of said two end stops is formed by the lower part, in particular both, wherein in particular the first end top is part of the top part of the lower part and the second end stop is part of the bottom part of the lower part of the operating input device. With such an operating input device, the damping element can be fixed in non-damping direction just by assembling of the lower part, if by assembling of the lower part the end stops are brought in their respective "locking position" relative to the damping element.

In a preferred embodiment, the operating input device is designed such that the at least one damping element can be arranged in between said two end stops by axial insertion into the recess until it rests with its shoulder against the adjacent contact surface before the top part and the bottom part have been assembled to the respective upper or lower part.

In one embodiment of an operating input device according to the present invention the operating input device comprises more than one damping element, wherein in particular at least two damping elements are arranged oppositely, preferably with their non-damping directions extending parallel. In some cases the arrangement of one damping element in every corner area seems to be advantageous. That means, for example a substantially rectangular operating input device having four corner areas may comprise four damping elements arranged in these corner areas.

In one embodiment of an operating input device according to the present invention, in particular in a very preferred embodiment of an operating input device according to the present invention, the operating input device is configured to generate a haptic feed-back to an operator's input, wherein the operating input device therefore further comprises a feedback actuation mechanism, which is preferably arranged at least partly in a void in between the upper part and the lower part of the operating input device.

In one embodiment of the operating input device according to the present invention, in particular in a preferred embodiment, the feedback actuation mechanism comprises or is an Eccentric Rotating Mass vibration motor (ERM) or a Linear Resonant Actuator (LRA).

ERMs and LRAs are generally known from prior art to which is referred herewith for further details. The ERM, also known as a pager motor, is preferably a DC motor with an offset (non-symmetric) mass attached to a shaft. As the ERM rotates, the centripetal force of the offset mass is asymmetric, resulting in a net centrifugal force, and this causes a displacement of the motor. With a high number of revolutions per minute, the motor is constantly being displaced and moved by these asymmetric forces. It is this repeated displacement that is perceived as a vibration.

In a preferred embodiment of an operating input device, the feedback actuation mechanism, in particular when it is an ERM, is configured and arranged to generate a feedback force at least in the first haptic feedback generating direction, in particular also in the operating input force direction, preferably in a plane spanned by the first haptic feedback generating direction and the operating input force direction.

LRAs are an alternative to eccentric rotating mass vibration motors and have several distinct advantages. They are becoming more popular for haptic applications. For example, they have better haptic performance characteristics and are more efficient. For these reasons, they are used in many handheld and touchscreen devices, amongst other applications. A LRA has to arranged with respect to the direction in which haptic feedback should be generated. In a preferred embodiment of an operating input device having an LRA, the LRA is configured to generate a feedback force at least in the first haptic feedback generating direction.

In one embodiment of an operating input device according to the present invention the operating input device is configured to trigger at least one operating function, in particular at least one operating function in a vehicle. Due to the pleasant haptic feedback, which can be generated by an operating input device according to the present invention, a pleasant input control of at least one operating function, in particular with a pleasant haptic input feeling, can be achieved.

In one embodiment of the operating input device according to the present invention in particular in a further but also preferred embodiment, the operating input device is configured to trigger at least one operating function, in particular at least one operating function in a vehicle, wherein triggering of at least one operating function by the operating input device preferably requires a minimum operating force applied to the input surface of the operating input device in an input direction, preferably a minimum operating force in a direction perpendicular to the input surface. Thereby, a very advantageous operating input device can be provided, in particular an operating input device, which allows for example, grasping a steering wheel and touching at least one input area associated to an operating function without erroneous triggering of the associated operating function when the input force applied to the input surface is lower than a predetermined operating input force threshold. Thereby, operating errors or unintentional inputs can be reduced or even completely avoided.

A steering input device according to the present invention comprises at least one operating input device and is characterized in that the operating input device is an operating input device according to the present invention.

A steering input device according to the present invention may be for example a steering input device, in particular a steering wheel, preferably with at least one spoke, wherein the operating input device according to the present invention may for example be arranged, in particular integrated, in a spoke or in a centre area, preferably such that the operating input surface is flush with an adjacent steering wheel surface.

The preferred embodiments presented with respect to an operating input device according to the present invention and their advantages apply correspondingly to a steering input device according to the present invention and vice versa.

Further features of the invention will become apparent from the claims, the figures and the description of the figures. All the features and feature combinations mentioned above in the description as well as the features and feature combinations mentioned below in the description of the figures and/or shown alone in the figures can be used not only in the respectively indicated combination but also in other combinations or alone so far, the resulting combination may be carried out.

The invention will now be described with reference to a preferred, but non-limiting embodiment of the present invention and with reference to the accompanying drawings, wherein it is shown in FIG. 1 an embodiment of a steering input device in form of a steering wheel according to the present invention comprising two operating input devices according to the present invention, FIG. 2 an exploded view of another embodiment of an operating input device according to the present invention, FIG. 3 a first section view through the operating input device of FIG. 2 in an assembled state, and FIG. 4 a second section view through the operating input device of FIGS. 2 and 3 in an assembled state.

In FIG. 1 an embodiment of a steering input device 100 in form of a steering wheel 100 for a vehicle according to the present invention is illustrated, wherein the steering wheel 100 comprises two operating input devices 10 according to the present invention. The steering wheel 100 comprises a steering wheel rim 104 which is connected via three spokes 101, 102, and 103 to a not further indicated steering wheel centre.

Into each of the spokes 101 and 102, in particular into the left spoke 100 and into the right spoke 102, an operating input device 10 according to the present invention is integrated, wherein each of the operating input devices 10 is arranged in the spokes 101, 102 such that an operating input surface 11 is in flush with a steering wheel surface. Each of the operating input devices 10, in particular each of the operating input surfaces 11, comprises two input areas 11A and 11B respectively 11C and 11D, which each are associated to an operating function as for example volume increase or decrease or programme up or down for control of an entertainment system in a vehicle. The input areas 11A, 11B, 11C, and 11D each can be illuminated by a background light source.

Figure 2:
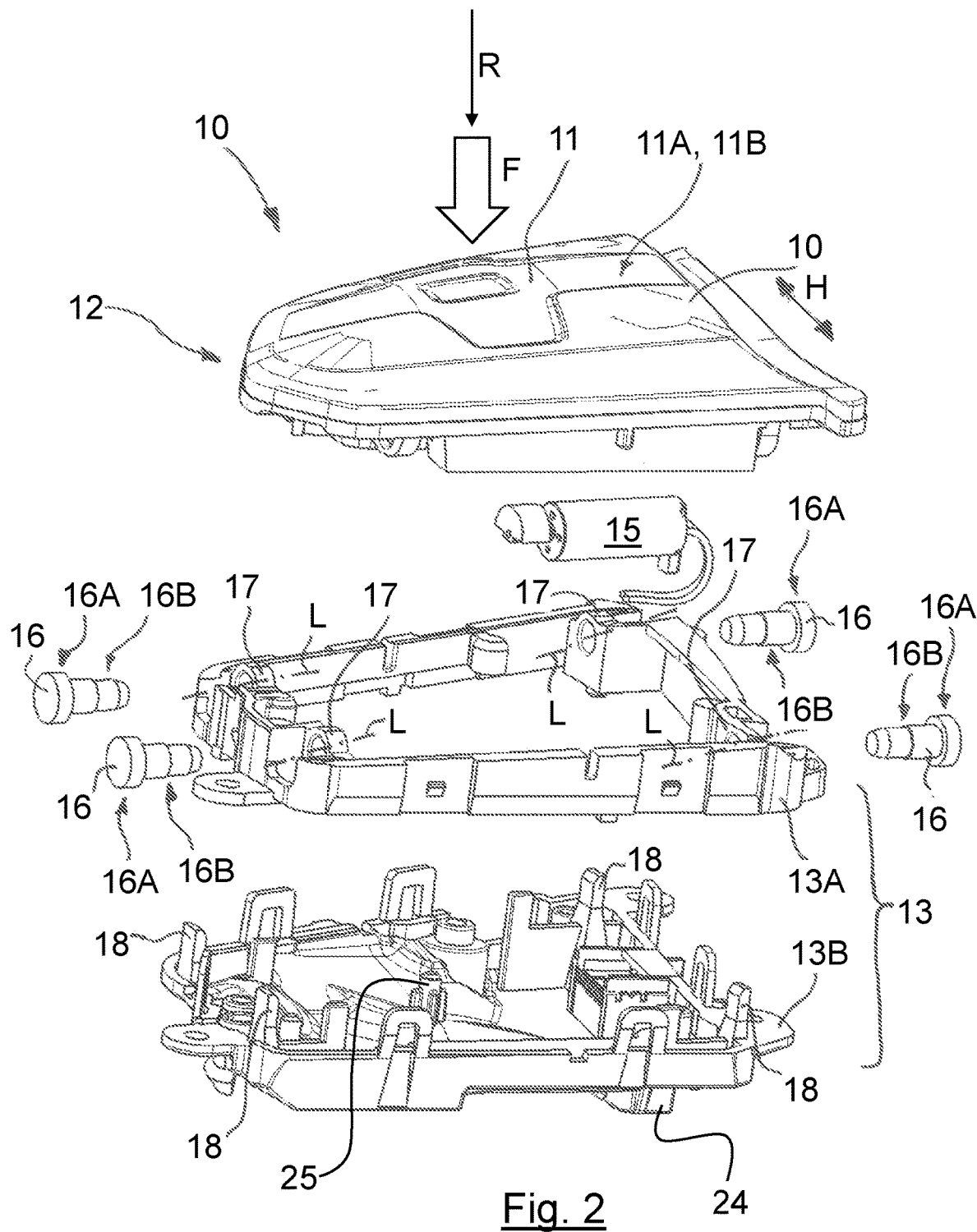

FIG. 2 shows an exploded view of another embodiment of an operating input device 10 according to the present invention for a steering wheel 100 as illustrated in FIG. 1. FIG. 3 illustrates a first section view through the operating input device 10 of FIG. 2 in an assembled state, and FIG. 4 a second section view through the operating input device 10 of FIGS. 2 and 3, which will be explained in detail in the following.

According to the present invention and as described above the operating input device 10 comprises an upper part 12 having an operating input surface 11 with two input areas 11A and 11B respectively 11C and 11D associated to at least one operating function. The operating input device 10 further comprises a lower part 13, which is serving as a support structure for the upper part 12.

The upper part 12 is relatively movable to the lower part 13 by an operating input force F applied on the operating input surface 11 in an operating input direction R extending at least substantially perpendicular to the operating input surface 11.

In this embodiment the upper part 12 and the lower part 13 each are assemblies of several single parts, wherein FIG. 2 shows the lower part 13 in an exploded view respectively in a dissembled state. The upper part 12 is illustrated as assembly only.

In this embodiment of an operating input device 10, the lower part 13 comprises a frame 13A serving as the top part 13A of the lower part 13 and bottom part 13B forming a rear cover 13B of the operating input device 10, wherein the frame 13A and the rear cover 13B can be mounted together via several unnamed snap-fit connections.

Upper part 12 and lower part 13, in particular the frame 13A and the rear cover 13B are preferably made of a rigid plastic material as e.g. polyamide (PA) or PMMA.

Each operating input device 10 of the steering wheel 100 is configured to trigger at least one operating function, in a vehicle the steering wheel 100 is installed. Since in this embodiment of a steering wheel 100 triggering of at least one operating function by the operating input device 10 requires a minimum operating force F applied to the input surface 11 of the operating input device 10, the operating input device 10 is further configured to detect the amount of the operating input force F applied, in particular the amount of this force in the operating input direction R.

For detecting the applied operating input force F, in particular in a direction perpendicular to the input surface 11, this embodiment of an operating input device 10 comprises an operating input force transfer element 14 (see FIG. 3) and a force sensor element 19 (see also FIG. 3), wherein by applying a sufficient input force F, the input force transfer element 14 will be pressed down to the force sensor element 19. Thereby a sensor signal characterizing the applied input force F will be generated and emitted to a control unit (not shown) for further processing.

Figure 3:
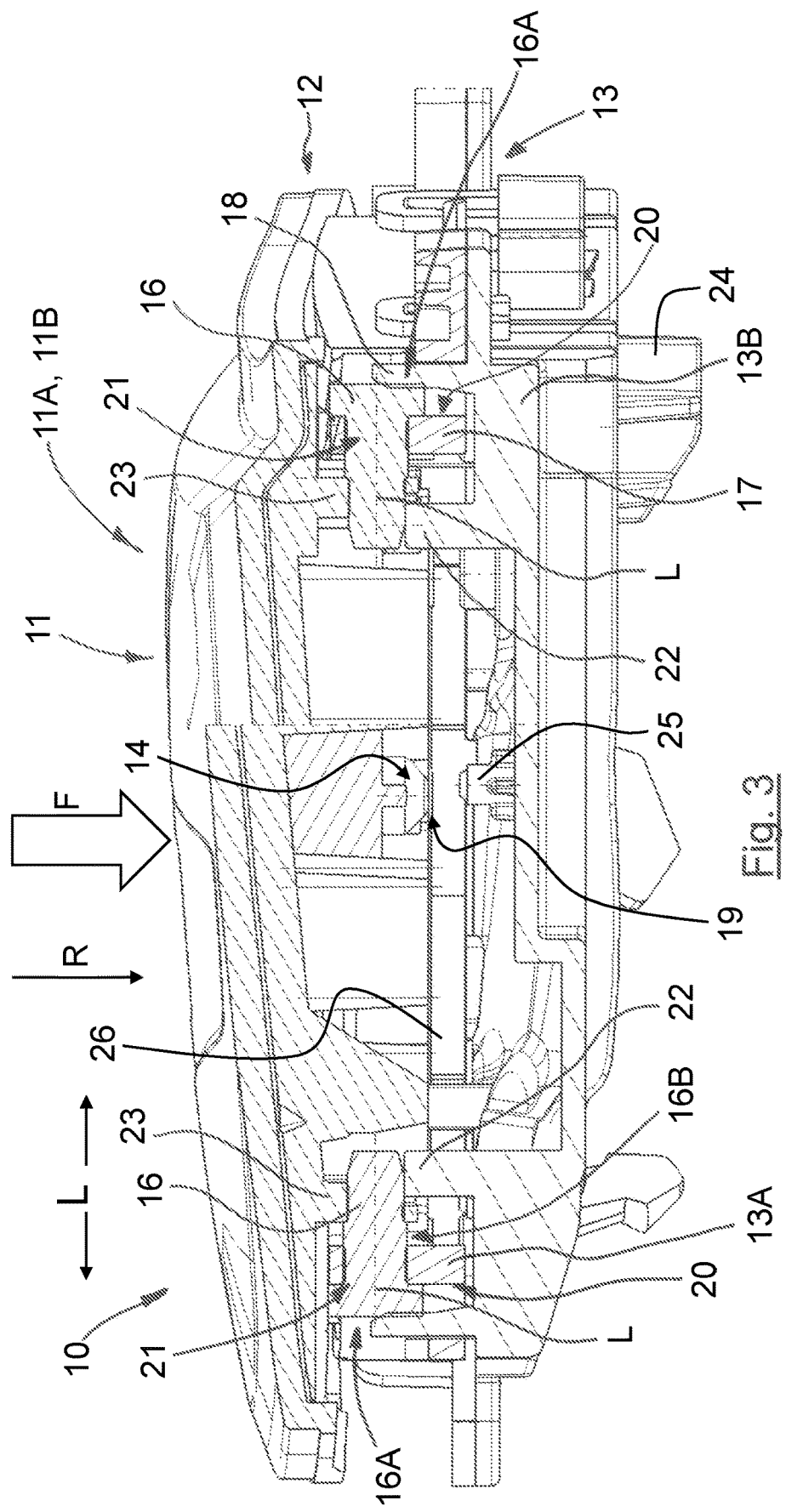

The force sensor element 19 is mounted onto a printed circuit board 26 which is engaged with center pin 25 serving as a positioning element 25 (see FIG. 3). Via a female plug 24, the printed circuit board 26 can be connected for signal and power supply with a corresponding control unit and/or a corresponding power source. Via that plug 24 the operating input device 10 can be connected to a control unit for control of at least one operating function.

The operating input device 10 is also configured to generate a haptic feedback to a user. Therefore, the upper part 12 and the lower part 13 are coupled movably relative to each other, in particular such that by a feedback actuation mechanism 15 (see FIG. 2) the upper part 12 is movable relatively to the lower part 13 at least in a first haptic feedback generating direction H extending at least substantially parallel to the operating input surface 11.

The feedback actuation mechanism 15 is an ERM (Eccentric Rotating Mass vibration motor) which is in this embodiment is configured to generate a vibration and thereby a feedback force in a plane spanned by the first haptic feedback generating direction H and the operating input force direction R.

The feedback actuation mechanism 15 is arranged in an inner void of the operating input device 10 between the upper part 12 and the lower part 13 in an assembled state in this embodiment of an operating input device 10 according to the present invention.

For providing a pleasant haptic feedback, i.e. a pleasant haptic feedback force, and for a pleasant input feeling, the operating input device 10 further comprises four damping elements 16 arranged in the corner areas of the operating input device 10. Each damping element 16 is configured to damp a relative movement between the upper part 12 and the lower part 13 in said operating input direction R and in said first haptic feedback generating direction H, wherein two damping elements 16 are respectively arranged opposite or next to each other with their non-damping directions L extending parallel to each other (see FIGS. 2 to 4).

The damping elements 16 each are made of a rubber material in one piece without any undercut, wherein all damping elements 16 of this embodiment are designed like a plug having a massive cover section 16A with a circle cross-section and having a larger outer diameter and a longitudinal, also massive body section 16B having a smaller outer diameter compared to the cover section 16A but also a circle cross-section.

The damping elements 16 are arranged in the operating input device 10 between the upper part 12 and the lower part 13, wherein the upper part 12 and the lower part 13 are in particular connected via said damping elements 16.

Figure 4:
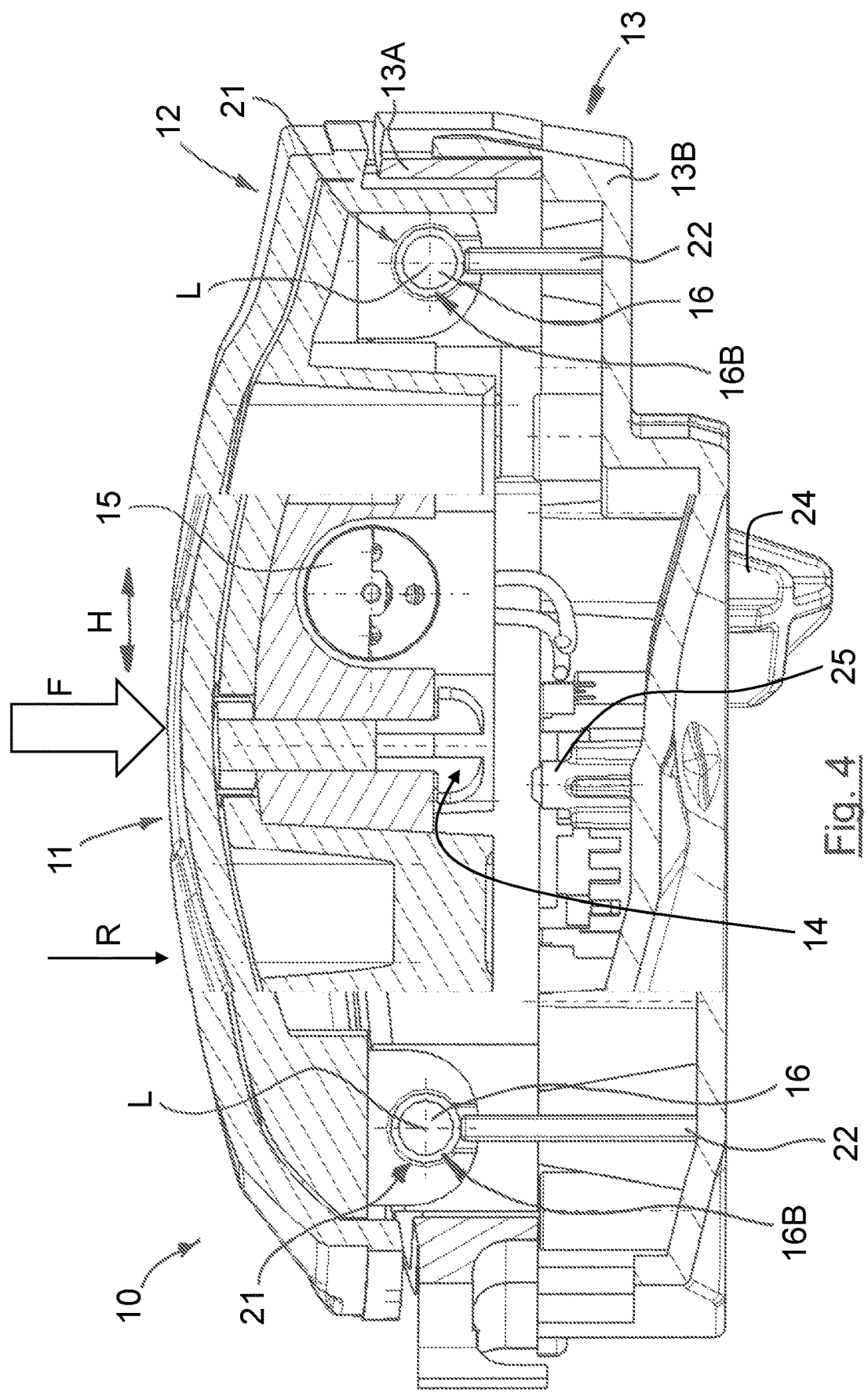

According to the present invention at least one damping element 16 is axially immovably arranged in the operating input device 10 in a non-damping direction L, which is different from the operating input direction R and the first haptic feedback generating direction H, wherein in this embodiment all damping elements 16 are arranged axially immovably along the non-damping direction L extending horizontal and perpendicular to the first haptic feedback generating direction H and the operating input force direction R in an assembled state of the operating input device 10 (see FIGS. 3 and 4).

Therefore, in an assembled state of the operating input device 10, all damping elements 16 are axially fixed in said non-damping direction L by first end stops 17 and second end stops 18 arranged oppositely to each other in the axial direction L, wherein the damping elements 16 are arranged between these end stops 17, 18 in axial direction L (see FIG. 3).

First end stops 17 are formed by a contact area 20 arranged adjacent to a through hole 21 respectively by a contact area 20 surrounding this through hole 21, wherein the damping elements 16 are configured to be arranged with their shoulder formed by the diameter transition between body section 16B and cover section 16A in contact with said contact area 20 to limit axial moving to one side along non-damping direction L. The contact surfaces 20 forming said end stops 17 each are extending perpendicular to the non-damping direction L in which the damping elements 16 are axially immovably.

An axial moving of the damping elements 16 in the other non-damping direction L is limited by the second end stops 18, which each are protrusions 18 also extending perpendicular to said non-damping direction L.

The first end stops 17 each comprising a through hole 21 and a surrounding contact area 20 are part of the top part 13A of the lower part assembly 13. The protrusions 18 forming the second end stops 18 are part of the rear cover 13B (the bottom part 13B) of the lower part assembly 13.

This design allows a very easy and fast assembly of the operating input device 10 without additional elements for locking the damping elements 16 in their axial position in non-damping direction L.

For assembling of the operating input device 10 after providing the several parts 12, 13A, 13B, 16, the damping elements 16 have to be plugged into the through holes 21 with their body sections 16B until their shoulders are in contact with the corresponding contact area 20 of the corresponding first end stop 17.

For connecting upper part 12 with lower part 13, the body sections 16B have also plugged through protrusions 23 of the upper part 12 (see FIG. 3). Thereby, an easy and damped movable connection between the upper part 12 and the lower part 13 can be provided.

After the damping elements 16 have been plugged into the through holes 21 completely, the bottom part 13B, i.e. the rear cover 13B of the operating input device 10 can be put together with the top part 13A (the frame 13A) of the lower part 13, in particular in a direction perpendicular to the non-damping direction L. Thereby, protrusions 18 will be brought into a locking position in which they form the second end stops 18 and prevent axial moving of the damping elements 16.

To avoid damage of the damping elements 16, in particular a shear off of the damping elements 16 due to too high input forces F, each damping element 16 is furthermore supported by a further protrusion 22 also extending perpendicular to the non-damping direction L, on which the damping element rests with its body section 16B, wherein said supporting protrusion 22 is preferably part of the bottom part 13B of the lower part 13.

In addition to the exemplary described embodiments, which are not to be understood restrictively, various further embodiments are possible without leaving the scope of protection defined by the patent claims.

REFERENCE SIGN LIST 100 steering input device according to the present invention
10 operating input device according to the present invention
11 operating input surface
11A, 11B input area
11C, 11D
12 upper part
13 lower part
13A top part of the lower part
13B bottom part of the lower part
14 operating input force transfer element
15 feedback actuation mechanism
16 damping element
16A cover section of the damping element
16B body section of the damping element
17 first end stop
18 second end stop (protrusion)
19 force sensor element
20 contact area
21 recess
22, 23 protrusion
24 female plug
25 positioning element
26 circuit board
101, 102, 103 spoke of the steering wheel
104 steering wheel rim
F input force
H first haptic feedback generating direction
L non-damping direction
R operating input direction

The invention claimed is:

1. The operating input device for a vehicle for arrangement in an interior of a vehicle, in a steering input device of the vehicle, comprising:
an upper part comprising an operating input surface with at least one input area associated or associable to at least one operating function, and
a lower part serving as a support structure for the upper part,
wherein the upper part is relatively movable to the lower part by an operating input force applied on the operating input surface in an operating input direction extending at least substantially perpendicular to the operating input surface,
wherein for generating a haptic feedback the upper part and the lower part are coupled movably relative to each other such that by a feedback actuation mechanism, which is couplable to the operating input device, the upper part is movable relatively to the lower part at least in a first haptic feedback generating direction extending at least substantially parallel to the operating input surface,
wherein the operating input device further comprises at least one damping element arranged and configured to damp a relative movement between the upper part and the lower part in said operating input direction and/or in said first haptic feedback generating direction,
wherein the at least one damping element is axially immovably arranged in the operating input device in a non-damping direction different from the operating input direction and the first haptic feedback generating direction, and
wherein the at least one damping element is free of an undercut.

2. The operating input device according to claim 1, wherein the at least one damping element is axially fixed in the operating input device in said non-damping direction by a first end stop and a second end stop arranged oppositely to each other in an axial direction, wherein the at least one damping element is arranged between these end stops in the axial direction.

3. The operating input device according to claim 1, wherein the at least one damping element is arranged in the operating input device between the upper part and the lower part, wherein the at least one damping element is supported by the lower part in an operating input direction.

4. The operating input device according to claim 1, wherein the first end stop or the second end stop is formed by a contact surface adjacent to a recess, wherein said contact surface forming said end stop is extending perpendicular to the non-damping direction in which the at least one damping element is axially immovable.

5. The operating input device according to claim 1, wherein the second end stop or the first end stop is formed by a protrusion extending perpendicular to said non-damping direction in which the at least one damping element is axially immovable.

6. The operating input device according to claim 1, wherein the operating input device comprises more than one damping element, wherein at least two damping elements are arranged oppositely with their non-damping directions extending parallel.

7. The operating input device according to claim 1, wherein the operating input device is configured to generate a haptic feed-back to an operator's input, and further comprises: a feedback actuation mechanism, which is arranged at least partly in a void in between the upper part and the lower part of the operating input device.

8. The operating input device according to claim 1, wherein the feedback actuation mechanism comprises or is an Eccentric Rotating Mass vibration motor or a Linear Resonant Actuator.

9. The operating input device according to claim 1, wherein the operating input device is configured to trigger the at least one operating function.

10. A steering input device comprising at least one operating input device according to claim 1.

11. The operating input device according to claim 1, wherein the operating input device is configured to trigger at least one operating function in a vehicle.

12. The operating input device according to claim 1, wherein the lower part and/or the upper part comprises or is an assembly made up of several parts, wherein said assembly comprises at least a top part and a bottom part, wherein one of two axial end stops the damping element is arranged in between is part of the top part, and wherein an other one of said two axial end stops is part of the bottom part.

13. The operating input device according to claim 12, wherein the contact area is part of the top part or of the bottom part of said assembly whilst a protrusion is part of a respective counterpart of the assembly.

14. An operating input device for a vehicle for arrangement in an interior of the vehicle, in a steering input device of the vehicle, comprising:
an upper part comprising an operating input surface with at least one input area associated or associable to at least one operating function, and
a lower part serving as a support structure for the upper part,
wherein the upper part is relatively movable to the lower part by an operating input force applied on the operating input surface in an operating input direction extending at least substantially perpendicular to the operating input surface, wherein for generating a haptic feedback the upper part and the lower part are coupled movably relative to each other such that by a feedback actuation mechanism, which is couplable to the operating input device, the upper part is movable relatively to the lower part at least in a first haptic feedback generating direction extending at least substantially parallel to the operating input surface, wherein the operating input device further comprises at least one damping element arranged and configured to damp a relative movement between the upper part and the lower part in said operating input direction and/or in said first haptic feedback generating direction, wherein the at least one damping element is axially immovably arranged in the operating input device in a non-damping direction different from the operating input direction and the first haptic feedback generating direction, and wherein the at least one damping element has a plug-like shape having at least a cover section having a larger outer diameter and a body section having a smaller outer diameter compared to the cover section.

* * * * *